United States Patent [19]

Yang et al.

[11] Patent Number: 5,219,227
[45] Date of Patent: Jun. 15, 1993

[54] METHOD AND APPARATUS FOR DETERMINING BURNED GAS TEMPERATURE, TRAPPED MASS AND $NO_x$ EMISSIONS IN AN INTERNAL COMBUSTION ENGINE

[75] Inventors: Jialin Yang, Westboro; Steven L. Plee; Donald J. Remboski, Jr., both of Northborough, all of Mass.

[73] Assignee: Barrack Technology Limited, West Perth, Australia

[21] Appl. No.: 566,964

[22] Filed: Aug. 13, 1990

[51] Int. Cl.$^5$ .............................................. G01K 1/08
[52] U.S. Cl. ..................................... 374/143; 374/144
[58] Field of Search ............... 374/143, 144, 130, 131, 374/127, 128, 161; 356/43

[56] References Cited

U.S. PATENT DOCUMENTS

| | | |
|---|---|---|
| 3,067,610 | 12/1962 | Bockemuehl et al. . |
| 3,597,597 | 8/1971 | Pirlet ................................ 73/19.07 |
| 4,381,748 | 5/1983 | Eckert et al. . |
| 4,444,169 | 4/1984 | Kirisawa et al. . |
| 4,446,723 | 5/1984 | Boning et al. ....................... 374/144 |
| 4,679,934 | 7/1987 | Ganguly et al. ...................... 356/43 |
| 4,779,455 | 10/1988 | Kuroiwa et al. . |
| 4,780,832 | 10/1988 | Shah ................................. 374/130 |
| 4,887,574 | 12/1989 | Kuroiwa et al. . |
| 4,919,099 | 4/1990 | Extance et al. . |
| 4,930,478 | 6/1990 | Plee et al. . |
| 4,984,905 | 1/1991 | Amano et al. ....................... 374/143 |

FOREIGN PATENT DOCUMENTS 60-17239  1/1985 Japan .
WO89/11031 11/1989 World Int. Prop. O. .

Primary Examiner—Robert Raevis
Attorney, Agent, or Firm—Harness, Dickey & Pierce

[57] ABSTRACT

An arrangement is disclosed wherein a luminosity detector and a pressure transducer are used in an internal combustion engine to determine the burned gas temperature and trapped mass within each combustion chamber of the engine on a cycle-to-cycle basis or over a period of cycles, and to predict $NO_x$ emissions from the engine. Also disclosed is an arrangement wherein the burned gas temperature in each combustion chamber can be determined using only the luminosity detector.

4 Claims, 3 Drawing Sheets

METHOD AND APPARATUS FOR DETERMINING BURNED GAS TEMPERATURE, TRAPPED MASS AND $NO_x$ EMISSIONS IN AN INTERNAL COMBUSTION ENGINE

BACKGROUND OF THE INVENTION

This invention relates to a method and apparatus for determining certain conditions of engine operation, and more particularly, to an improved method and apparatus for determining burned gas temperature and trapped mass in the combustion chamber, and for predicting $NO_x$ emissions from the engine based on the luminosity and pressure detected in the combustion chamber.

With modern technology and electronics, many of the components and running conditions of an internal combustion engine can be controlled more accurately than with previous mechanical systems. For example, the control of the air/fuel ratio, spark timing, fuel injection timing and pulse, and other adjustable factors of engine operation are greatly facilitated through the use of electronic components and computers. However, in order to accurately sense the running of the engine and various phenomena occurring within the combustion chamber, it is necessary to provide a sensor that is directly positioned within the combustion chamber or in proximity to it and which senses the actual combustion process in the engine.

It has been understood that knocking can be determined by an optical sensor that operates within the combustion chamber and which senses the luminosity of the gases in that chamber. A type of engine sensor has been proposed that senses the luminosity of the gases within the combustion chamber. A variety of patents illustrating and describing the use of such sensors have issued including the following: 4,358,952; 4,369,748; 4,377,086; 4,393,687; 4,409,815; 4,412,446; 4,413,509; 4,419,212; 4,422,321; 4,422,323; 4,425,788; 4,468,949; 4,444,043; 4,515,132. For the most part, these patents disclose arrangements wherein the sensor is utilized to sense only total luminosity and to equate the luminosity signal to a knocking signal.

However, the inventors have determined that the measured luminosity in the combustion chamber alone or in combination with a pressure measurement can also be employed to determine the burned gas temperature in the combustion chamber. In addition, the inventors have found that the detected luminosity and pressure in the combustion chamber can be used to provide a determination of the trapped mass in the combustion chamber after each combustion cycle is completed, and to yield an estimate of $NO_x$ emissions from the engine.

It is, therefore, an object of this invention to provide an improved apparatus and method for operating an engine wherein the detected luminosity alone or in combination with the detected pressure in the combustion chamber can be used to determine the burned gas temperature in the combustion chamber.

It is a further object of this invention to provide an improved apparatus and method for operating an engine wherein the detected luminosity and pressure in the combustion chamber can be used to determine the trapped mass in the combustion chamber.

It is yet another object of this invention to provide an improved apparatus and method for operating an engine wherein the detected luminosity and pressure in the combustion chamber can be used to predict $NO_x$ emissions from the engine.

It is a still further object of this invention to provide engine control systems wherein the engine can be controlled in response to the determined burned gas temperature or trapped mass in the combustion chamber, or in response to the predicted $NO_x$ emissions. Once these combustion conditions are determined, various adjustable engine parameters such as air/fuel ratio, spark timing, fuel injection timing and pulse, and the like may be adjusted so as to obtain a desired value for these determined or predicted conditions in the engine.

SUMMARY OF THE INVENTION

This invention is adapted to be embodied in a method for operating an internal combustion engine and an apparatus therefor that has at least one combustion chamber and means for forming a combustible air/fuel mixture within the combustion chamber. In accordance with a first embodiment of the invention, the luminosity of a gas or gases in the combustion chamber is sensed or detected, and the burned gas temperature within the combustion chamber is determined based on the detected luminosity.

A second embodiment of the invention involves determining the burned gas temperature within the combustion chamber based on the detected luminosity in combination with the detected pressure within the combustion chamber.

In a third embodiment of the invention, both the luminosity of a gas or gases and the pressure in the combustion chamber are detected, and the trapped mass in the combustion chamber is determined based on this detected luminosity and pressure.

In a fourth embodiment of the invention, the luminosity of a gas or gases in the combustion chamber is detected and the pressure in the combustion chamber is also detected, and $NO_x$ emissions are predicted based on the detected luminosity and pressure.

DETAILED DESCRIPTION OF THE PREFERRED EMBODIMENTS

Figure 1:
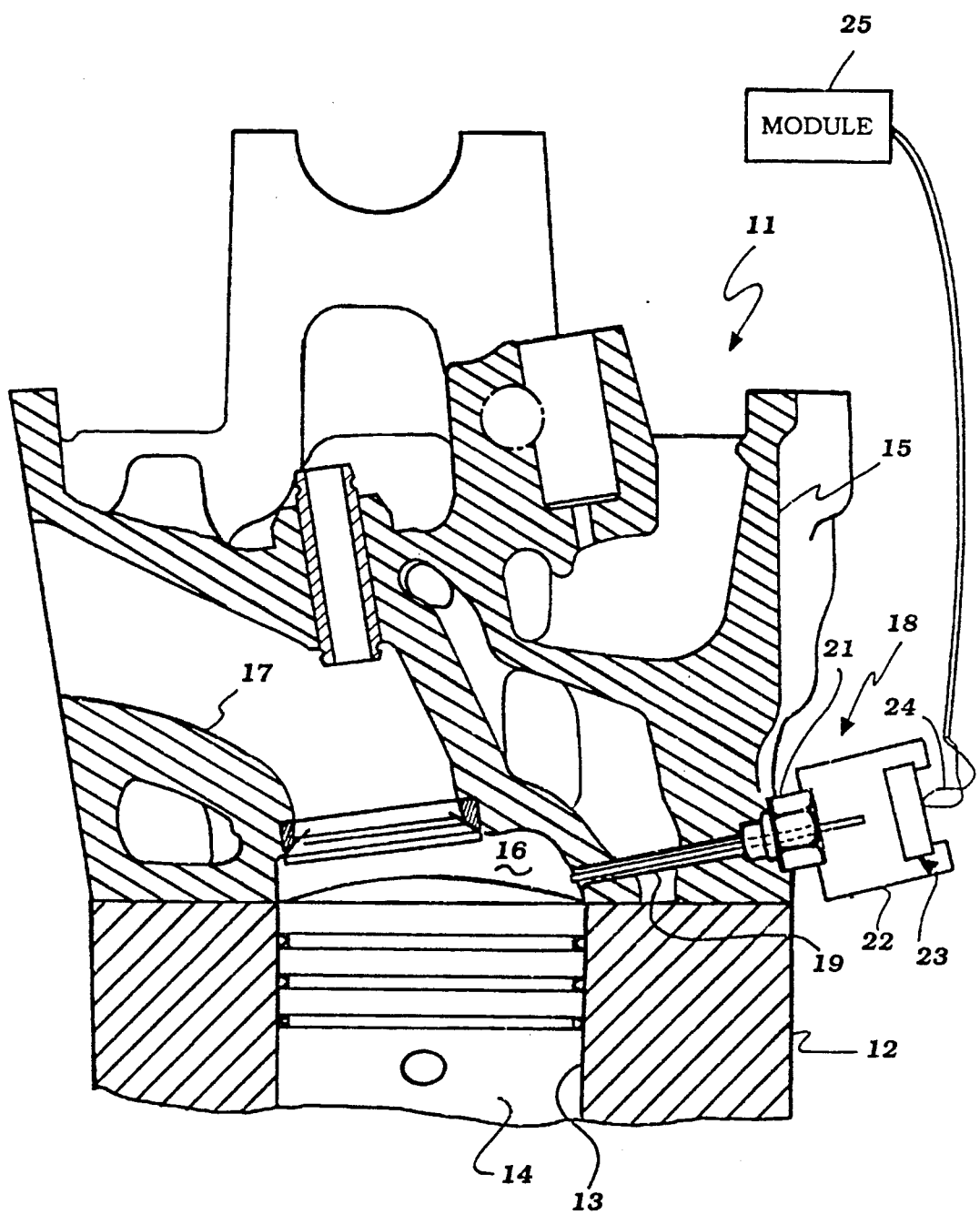
FIG. 1 illustrates a cross-sectional view taken through a single combustion chamber of a multi-cylinder internal combustion engine constructed and operated in accordance with the embodiments of the invention.
Figure 2:
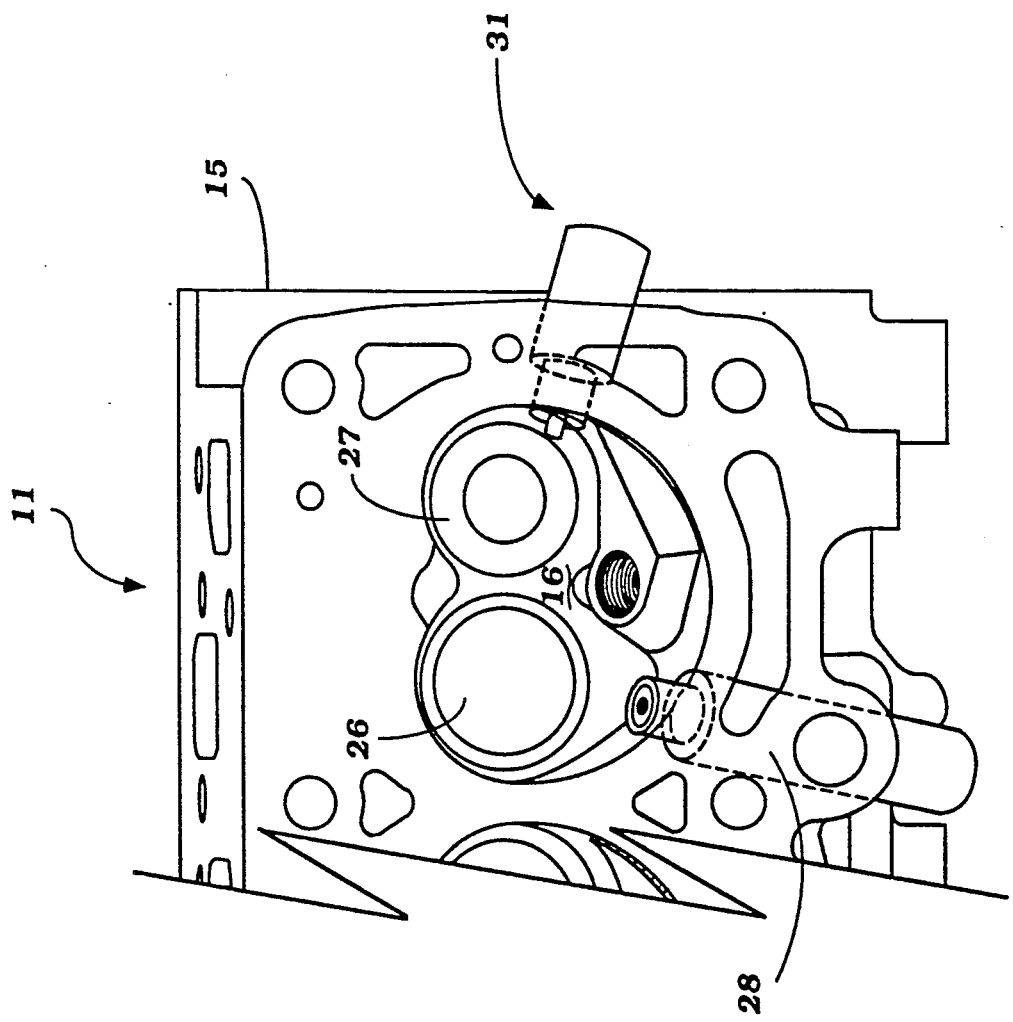
FIG. 2 shows the top of the combustion chamber and the arrangement of the luminosity detector and pressure transducer in that chamber as seen looking upward from the head of the piston.

Referring to FIGS. 1 and 2 of the drawings, a multi-cylinder internal combustion engine is identified generally by the reference numeral 11. It is to be understood that, although the invention has particular utility in multi-cylinder engines, the invention may also find application in single cylinder engines as well. Also, although the invention is described in conjunction with a reciprocating type engine, the principals of the invention may be utilized with engines of the non-reciprocating type, such as rotary engines, and with engines operating on either two-stroke or four-stroke cycles.

Inasmuch as the invention is concerned primarily with the combustion chamber and the conditions therein, only a cross-sectional view taken through one of the combustion chambers and view of the top of the combustion chamber looking up from the head of the piston are believed to be necessary to understand the environment in which the invention is practiced. This cross-sectional view illustrated in FIG. 1 shows a cylinder block 12 having a cylinder bore 13 in which a piston 14 is supported for reciprocation. The piston 14 is connected by means of a connecting rod (not shown) to a crankshaft (not shown) for providing output power from the engine 11.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with the combustion chamber 16 controlled by poppet type intake and exhaust valves 26 and 27 respectively (see FIG. 2) for admitting a charge to the combustion chamber 16 and for discharging the burnt charge from the combustion chamber 16. It is to be understood that the combustion chamber 16 may have a plurality of intake and exhaust valves, and that the engine 11 may include a plurality of combustion chambers 16.

The charge admitted to the combustion chamber 16 may comprise pure air or an air/fuel mixture that is formed by a suitable charge former such as a port or throttle body type fuel injector or carburetor. Alternatively, if pure air is delivered or injected into the chamber 16, direct cylinder or manifold injection may be employed for delivering or injecting fuel into the combustion chamber 16 to form the air/fuel mixture. The air/fuel ratio may be controlled in a variety of known manners such as by means of throttle valves, fuel control valves, injector pulse width, injection duration, injection timing, etc. Although an important feature of the invention is the determined or predicted parameters under which the air/fuel ratio may be controlled, the actual physical hardware for adjusting the air/fuel ratio is not part of the invention. However, in accordance with the invention, these various adjustable means mentioned above may be adjusted manually or automatically as part of an engine control loop so as to obtain a desired burned gas temperature, trapped mass or $NO_x$ emissions as determined from the luminosity and pressure measurements.

The engine 11 is preferably of the spark-ignited type but may be of the diesel type also. However, the types of controls exercised and the nature of the luminosity detecting or sensing may vary with different engines. The following discussion is concerned primarily with a spark ignited engine, and in an engine 11 of that type, a spark plug for each cylinder will be carried in the cylinder head 15 and have its gap exposed in the combustion chamber 16. The spark timing is controlled by a suitable mechanism which may be of any conventional type; however, the timing of the spark firing can be varied in response to the determined burned gas temperature or trapped mass, or in response to predicted $NO_x$ emissions.

If the engine 11 is of the diesel type, combustion can be initiated through the timing of the direct cylinder fuel injection, or in any of the other known manners normally employed in connection with diesel engines.

As has been previously noted, the invention is capable of embodiment in a variety of conventional types of internal combustion engines and, for that reason, the details of the engine construction are not necessary to understand how the invention can be practiced by those skilled in the art.

Referring now to FIG. 1, in accordance with the invention, there is provided in the combustion chamber 16, a luminosity detector, indicated generally by the reference numeral 18. The luminosity detector I includes a fiber optic probe 19 or other type of optical access which extends through the cylinder head 15 and has its end terminating at or within the combustion chamber 16. The detector 18 and fiber optic probe 19 may be of the type described in the application entitled "Luminosity Detector", Ser. No. 467,883, filed Jan. 22, 1990, in the names of Donald J. Remboski, et al., and assigned to the assignee of this application. The disclosure of this application is incorporated herein by reference. The probe 19 can be formed from a relatively inexpensive material such as synthetic sapphire ($Al_2O_3$) or other materials having similar characteristics. A probe 19 having a diameter of 0.06" has been found to be practical and makes it relatively easy to install in the cylinder head 15. Other suitable types of luminosity detectors and/or optical probes may also be used with this invention. An example of an alternate detector and probe is shown in FIG. 2 and is identified by the reference numeral 31.

Referring to the detector 18 of FIG. 1, the fiber optic probe 19 is held in place by means of a compression fitting 21 and has its outer end disposed within a light sealed housing 22 in proximity to a silicon photo detector 23 which converts the light received from the probe 19 into a voltage signal.

The type of photo detector 23 employed will depend to a large extent on the gas or gases whose emission is to be measured within the combustion chamber 16. A variety of emissions from the glowing gases in the combustion chamber 16 can be measured such as OH emissions, CH emissions, $CO_2$ emissions, $C_2$ emissions and/or $H_2O$ emissions. The type of detector employed for the specific emissions will vary. However, if working primarily with $H_2O$ emissions, there is a stronger signal and a less expensive detector such as a silicon photo detector 23 may be employed.

Also, depending on the particular gas or gases to be detected or sensed, it may be desirable to provide a monochromator or optical filter in front of or on the silicon photo detector 23 so as to select a desired wavelength of light to be measured. For this application, the detector 23 is employed to measure the overall radiant emission from products of combustion (primarily $H_2O$) in the near infrared region at a single wavelength or over a range of wavelengths between 850 nm and 1000 nm. For example, a wavelength band centered at 927.7 nm $+/-20$ nm can be used. The near infrared region is monitored because it is not strongly influenced by radiant emission from the walls of the combustion chamber 16, nor is it sensitive to emission from the flame surface. In addition, this particular wavelength band coincides with the peak spectral response of the silicon photo detector 23. It is to be understood that the detector 23 is utilized in connection with a generally known type of detecting circuit that includes a biasing voltage which is applied to the detector 23.

The detector 23 is connected to a remotely positioned module 25 by means of conductors 24 for outputting a voltage signal thereto. In addition to converting the voltage signal from the silicon photo detector 23 to an output indicative of luminosity within the combustion chamber 16, the remotely positioned module 25 which may measure certain engine parameters as well, may also receive input signals from other sensors normally employed on the engine, for example, exhaust oxygen, intake manifold pressure and temperature, engine speed, and spark timing angle sensors. These types of sensors are normally employed with modern internal combustion engines and their signals can be processed in conjunction with the luminosity and pressure signals so as to provide certain measured characteristics of the engine operation. The remotely positioned module 25 may be of any suitable type and is particularly adapted to transmit the signal from the detector 23 into an output indicative of luminosity within the combustion chamber 16.

In several embodiments of the invention a pressure detector or transducer 28 of any suitable type will also be positioned within the cylinder head 15. This in-cylinder pressure transducer 28, is used to sense the actual pressure within the combustion chamber 16 and output an electrical signal to the remotely positioned module 25, or to a separate computer control unit. This electrical signal is indicative of the sensed pressure in the combustion chamber 16. In accordance with several embodiments of the invention, this pressure signal is also used as a basis for determining the burned gas temperature and trapped mass in the combustion chamber 16, as well as providing an estimate of the $NO_x$ emissions from the engine 11.

To determine the burned gas temperature in the combustion chamber 16, the luminosity is measured at two different points in time or at two different crank angles during the expansion stroke, after combustion is complete. The measured luminosity (L) within the combustion chamber 16 is related to the burned gas temperature ($T_b$) as follows:

$$\frac{L_1}{L_2} = \frac{A_2 \exp(-C_2/WT_{b1})}{A_1 \exp(-C_2/WT_{b2})}$$

where $L_1$ and $L_2$ = the measured luminosity (radiant flux) within the combustion chamber 16 at two different points, $A_1$ and $A_2$ = the surface areas within the combustion chamber 16 at the two different points of luminosity measurement, which can be calculated as a known function of crank angle, $C_2$ = Planck's Second Radiation Constant, W = wavelength, which for this application is preferably 927.7 nm, and $T_{b1}$ and $T_{b2}$ = the burned gas temperatures at the two different points of luminosity measurement.

During the expansion stroke, the burned gas temperatures $T_{b1}$ and $T_{b2}$, and volumes ($V_1$ and $V_2$) at the two different points of luminosity measurement which can also be calculated as a known function of crank angle are related by the following polytropic equation:

$$T_{b1}V_1^{n-1} = T_{b2}V_2^{n-1}$$

where n = polytropic coefficient. This polytropic coefficient can be determined from a pressure measurement using the pressure transducer 28 as follows: n = the slope of the line of log Volume vs. log Pressure during expansion. Alternatively, if pressure is not measured, the polytropic coefficient can usually be estimated at between 1.25 and 1.35.

Since $L_1$ and $L_1$ are measured, and n can be determined from a pressure measurement or estimated, and $V_1$, $V_2$, $A_1$ and $A_2$ can be calculated, the above two equations can be solved simultaneously to yield $T_{b1}$ or $T_{b2}$. Thus, the burned gas temperature at a particular point during the expansion stroke after combustion is complete can be directly determined based on the detected and measured luminosity and the detected and measured pressure within the combustion chamber 16 without performing heat release analysis. This temperature can be determined for each cycle of operation, or an average temperature can be obtained over any number of cycles. When n is estimated, this burned gas temperature can be approximated for each cycle or the percent variation in the approximate burned gas temperature over a number of cycles can be determined using only the luminosity measurement. However, using both luminosity and pressure provides a more precise temperature measurement.

In addition, the combination of the determined burned gas temperature and pressure measurement can be used to determine the trapped mass within the combustion chamber 16 for each cycle of operation. After the burned gas temperature is determined, trapped mass can be determined from the ideal gas law: PV=nRT, where P (pressure) is determined by the pressure transducer 28, T (temperature of the burned gas) is determined as set forth above, V (volume) is calculated as a known function of crank angle, and R is the universal gas constant. The equation can then be solved to yield n, which is the number of moles in the gas sample. Having determined n, the trapped mass of the gas in the combustion chamber 16 can be determined in accordance with the formula $m = nM_w$, where m = the trapped mass of the gas sample in the combustion chamber 16, and $M_W$ is the molecular weight of the gas mixture which is approximately 29.

The luminosity and pressure measurements can also be used to predict $NO_x$ emissions from the engine 11. The inventors have shown that the luminosity measurement in spark ignition engines can be described by the equation:

$$L = C \frac{m_b}{A} \exp(-C_2/\lambda T_b)$$

where
L = measured monochromatic radiation intensity
C = constant
$C_2$ = constant, 1,4388 cm-K
$m_b$ = mass of burned gas
A = combustion-chamber surface area
$\lambda$ = wavelength
$T_b$ = burned-gas temperature Solving this equation for $T_b$ and substituting into the NO formation rate expression of Heywood, J. B., *Internal Combustion Engine Fundamentals*, pp. 572-581, McGraw-Hill, 1988, the disclosure of which is incorporated herein by reference, which assumes that the governing equations of NO formation are those of Zeldovich and that all the species in the burned gas are in their equilibrium concentrations except for NO, yields the following expression in terms of the luminosity signal:

$$\frac{[\mathrm{NO}]_f}{[m_{tot}]} = C' \frac{1}{n} D_\phi^{\frac{1}{2}} \int_{\theta=\theta_x}^{\Theta} \left(\frac{m_{tot}}{V}\right)^{\frac{1}{2}} \left(\frac{LA}{m_{tot} X}\right)^{\frac{67800\lambda}{C_2}} \frac{1 - R_{NO}^2}{1 + R_{NO} R_\phi} d\theta$$

where $$R_{NO} = \frac{C_R ([\mathrm{NO}]_f/[m_{tot}])}{D_\phi^{\frac{1}{2}}(LA/m_{tot} X)^{\frac{10825\lambda}{C_2}}}$$

$$D_\phi = \left( C_\phi + \exp(B_\phi)\left(\frac{LA}{C m_{tot} X}\right)^{\frac{A_\phi \lambda}{C_2}} \right)\bigg|_{\theta=\theta}$$

The above parameters are defined as follows:
A: combustion-chamber surface area
$A_\phi$: function of equivalence ratio
$B_\phi$: function of equivalence ratio
$C, C''$: constants
$C_2$: constant, 1.4388 cm-K
$C_R$: constant
$C_\phi$: function of equivalence ratio
$D_\phi$: function of equivalence ratio and temperature
L: measured monochromatic radiation intensity
$m_{tot}$: trapped mass
n: engine speed, rpm
$R_{NO}$: ratio of concentrations, $[\mathrm{NO}]/[\mathrm{NO}]_e$
$R_\phi$: function of equivalence ratio
V: combustion-chamber volume
X: mass-burned fraction
$\Theta$: engine crank angle of NO freezing
$\theta$: engine crank angle
$\theta$: crank angle of main combustion
$\lambda$: wavelength
[ ]: concentration, mole/cm$^3$
with subscripts defined as:
O: time at start of combustion
b: burned
e: at equilibrium condition
f: mass fraction
Integrating over all packets of burned-gas, the exhaust NO emission becomes $$\frac{[\mathrm{NO}]}{[m_{tot}]} = \int_0^1 \frac{[\mathrm{NO}]_f}{[m_{tot}]} dX$$

Figure 3:
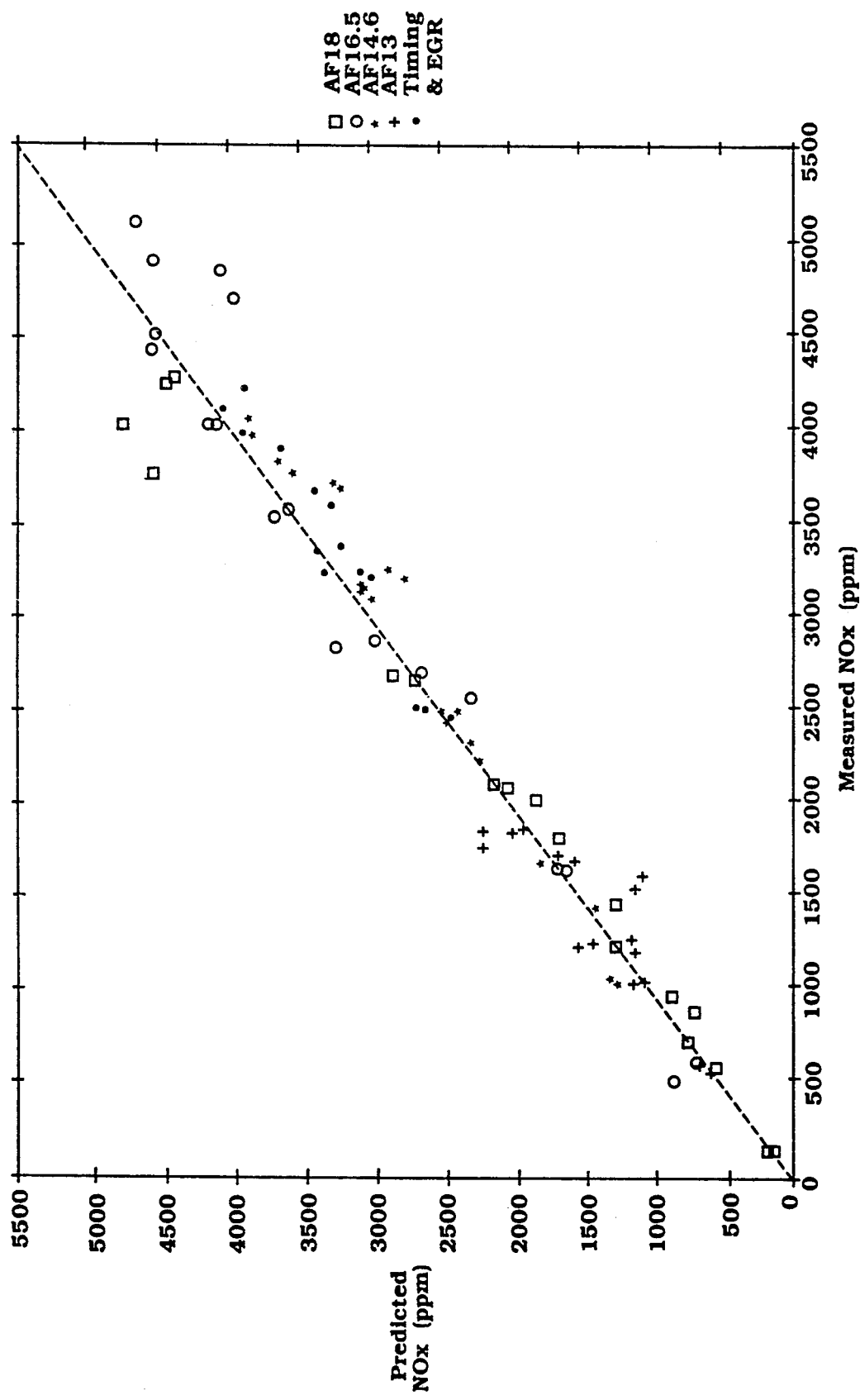
FIG. 3 shows the correlation between the predicted NOx using the in-cylinder luminosity and pressure measurement and the measured NOx at different engine operating and running conditions.

Experimental data were used to determine the constants in the model. The pressure data were used in the heat-release model as set forth in Heywood, J. B., *Internal Combustion Engine Fundamentals* pp. 383–388, the disclosure of which is incorporated herein by reference, to determine the mass-burned fraction. $m_{tot}$ was obtained from the combination of pressure and luminosity using the ideal-gas law. The measured air-fuel ratio was used to determine the functions $A_\phi$, $B_\phi$, $C_\phi$, $D_\phi$, and $R_\phi$. FIG. 3 shows the correlation between the predicted $\mathrm{NO}_x$ using the in-cylinder luminosity and pressure measurement and the measured $\mathrm{NO}_x$ being emitted from the engine 11 at different engine operating and running conditions.

It should be readily apparent from the foregoing description that the use of the luminosity detector and its signal either alone or in combination with the pressure transducer and its signal is extremely effective in determining the burned gas temperature in the combustion chamber during each cycle of operation or in determining an average temperature over a number of cycles. If the burned gas temperature is determined during each cycle, cycle-to-cycle variations may be detected. In addition, luminosity alone or with pressure can be measured in each combustion chamber of a multi-cylinder engine so as to detect chamber to chamber variations. Trapped mass within the combustion chamber can also be measured on a cycle-to-cycle basis or over a number of cycles and can also be measured individually in each chamber of a multi-cylinder engine using the luminosity and pressure measurements. The luminosity and pressure measurements can also be used to provide an indication of $\mathrm{NO}_x$ being emitted from the engine 11.

Those skilled in the art and armed with this knowledge should be able to provide various engine controls such as the timing of the spark ignition and timing and duration of fuel injection or changing of air/fuel ratios through premixing devices such as carburetors or port injectors so as to obtain optimum or desired engine performance in response to these measured characteristics, and to minimize cycle-to-cycle and cylinder-to-cylinder variations.

The foregoing description is that of preferred embodiments of the invention and various changes and modifications may be made without departing from the spirit and scope of the invention, as defined by the appended claims.

We claim:

1. A method for operating an internal combustion engine having at least one combustion chamber and means for forming a combustible air/fuel mixture within the combustion chamber, comprising detecting the luminosity within the combustion chamber, detecting the pressure within the combustion chamber, calculating the surface area of the combustion chamber and determining the burned gas temperature based on the detected luminosity, the detected pressure and the calculated surface area of the combustion chamber.

2. A method for operating an internal combustion engine as recited in claim 1, wherein the luminosity in the combustion chamber is detected in a wavelength range from about 850 nm to about 1,000 nm.

3. A method for operating an internal combustion engine as recited in claim 2, wherein the luminosity of $H_2O$ is detected in the combustion chamber.

4. A method for operating an internal combustion engine as recited in claim 1, wherein the burned gas temperature is determined in accordance with the following equations:

$$\frac{L_1}{L_2} = \frac{A_2 \exp(-C_2/WT_{b1})}{A_1 \exp(-C_2/WT_{b2})}$$

-continued $$T_{b1}V_1^{n-1} = T_{b2}V_2^{n-1}$$

wherein $L_1$ and $L_2$ are respectively the detected luminosity within the combustion chamber at two different points, $A_1$ and $A_2$ are respectively the surface area within the combustion chamber at the two different points of luminosity detection, $C_2$ is Planck's Second Radiation Constant, W is the wavelength at which the luminosity is detected, $T_{b1}$ and $T_{b2}$ are respectively the burned gas temperature at the two different points of luminosity detection, $V_1$ and $V_2$ are respectively the volumes of the combustion chamber at the two different points of luminosity detection and n is the polytropic coefficient.

* * * * *